May 5, 1925.
R. I. SHORT
ADJUSTABLE SUPPORT
Filed June 2, 1920
1,537,039
2 Sheets-Sheet 1
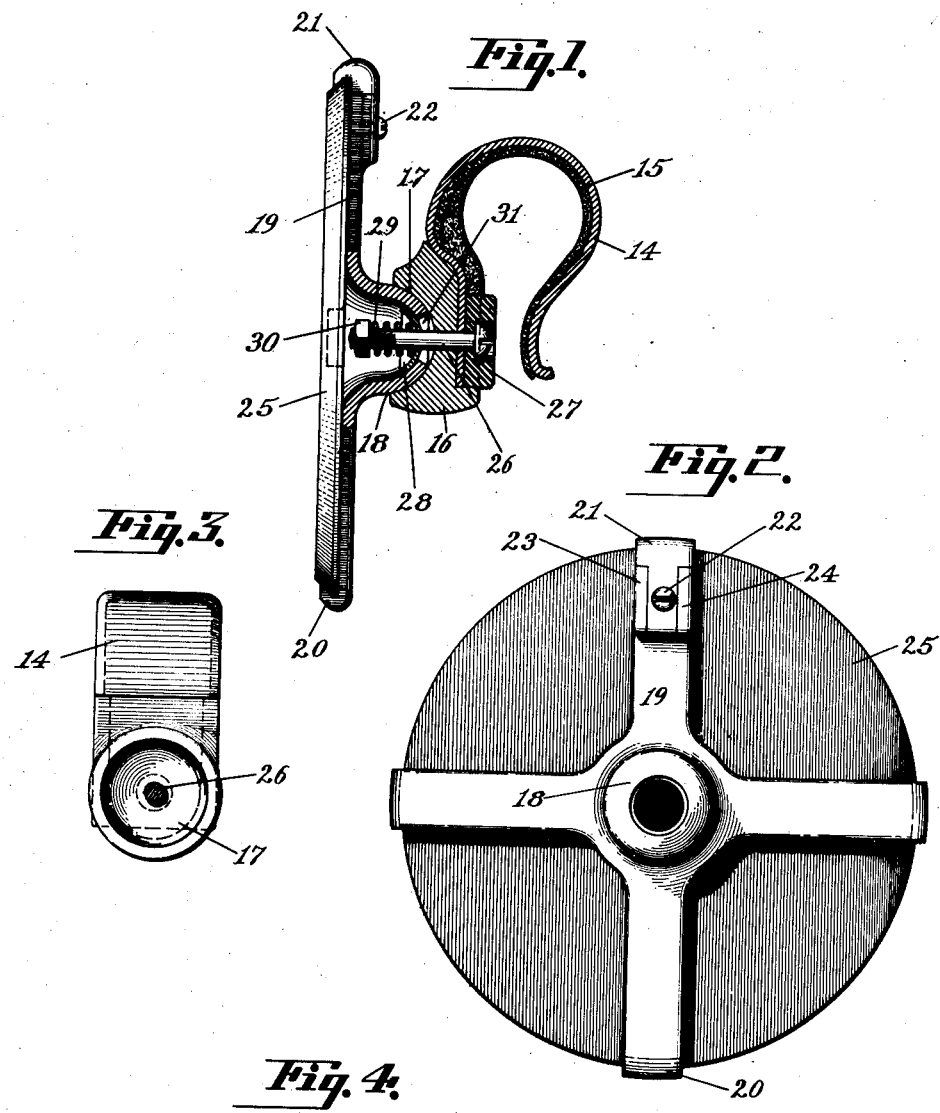
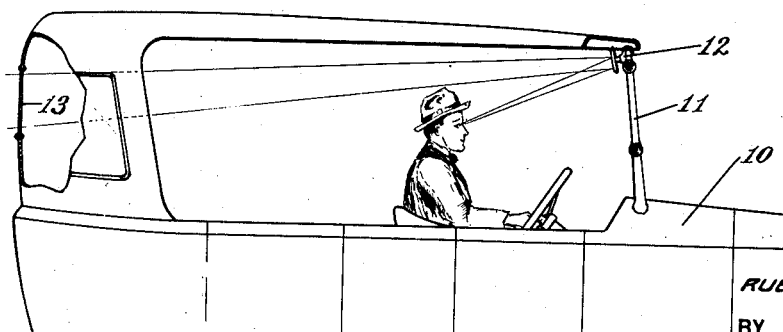
INVENTOR
RUEL I. SHORT
BY
Chas E. Townsend
ATTORNEY May 5, 1925.  1,537,039
R. I. SHORT
ADJUSTABLE SUPPORT
Filed June 2, 1920  2 Sheets-Sheet 2
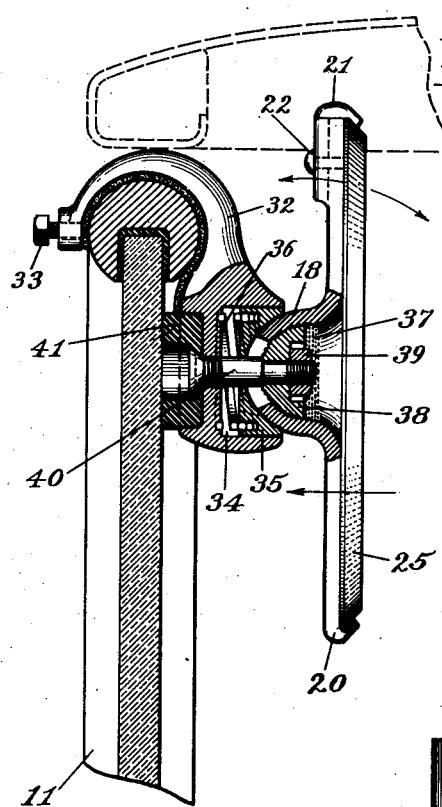
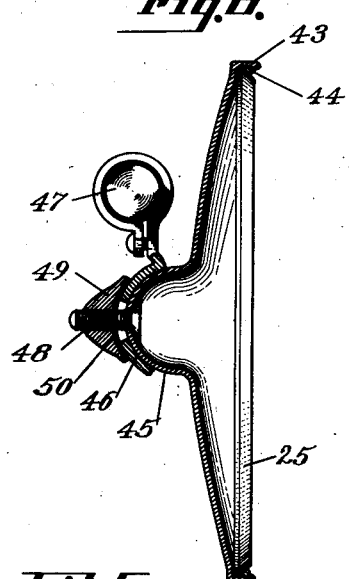
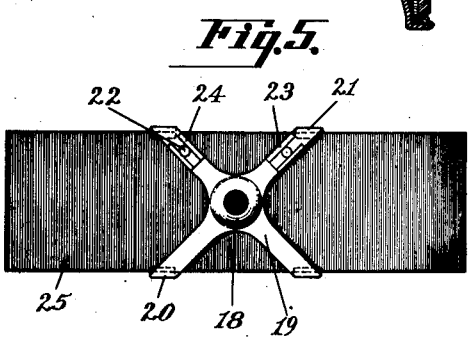
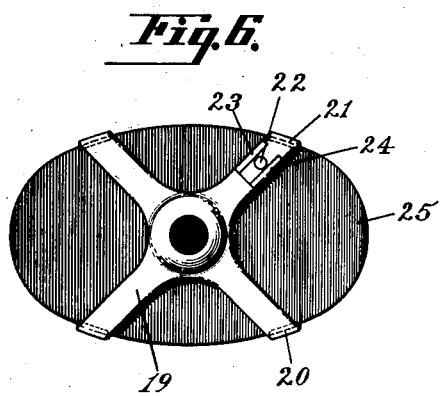
INVENTOR
RUEL I. SHORT
BY Chas E. Townsend,
ATTORNEY

Patented May 5, 1925.

1,537,039

UNITED STATES PATENT OFFICE.

RUEL I. SHORT, OF LOS ANGELES, CALIFORNIA, ASSIGNOR TO ESSENDEE CORPORATION, OF LOS ANGELES, CALIFORNIA, A CORPORATION OF CALIFORNIA.

ADJUSTABLE SUPPORT.

Application filed June 2, 1920. Serial No. 386,135.

*To all whom it may concern:*

Be it known that I, RUEL I. SHORT, a citizen of the United States, residing at Los Angeles, in the county of Los Angeles and State of California, have invented a new and useful Improvement in Adjustable Supports, of which the following is a specification.

This invention relates to an adjustable support particularly adapted for use with rear sight mirrors applied to automobiles, and other fixtures requiring universal adjustment.

It is the principal object of the present invention to provide a universal joint designed to adjustably hold a mirror, spotlight, or other such device in a desired angular position by a joint structure which will permit instant movement of the device to the position desired and which will automatically hold the device in this angular position so that it will not be displaced by the vibration and shock incident to the movement of the vehicle.

The present invention contemplates the use of a supporting clip which may be detachably secured to a rigid support and which in turn carries a ball and socket joint to which an article such as a mirror or lamp may be secured and by means of which universal movement of the article may be obtained while at the same time frictionally holding the joint in its adjusted position.

The invention is illustrated by way of example in the accompanying drawings, in which:

Figure 1 is a view in side elevation showing the invention as applied to a mirror and having parts broken away to more clearly disclose its construction.

Fig. 2 is a view in rear elevation showing the mounting frame and the ball portion of the joint.

Fig. 3 is a view in front elevation as showing the mounting clip of the socket of the joint.

Fig. 4 is a fragmentary view in side elevation illustrating the manner in which the mirror may be applied to a motor vehicle and properly adjusted to meet the requirements of the driver.

Fig. 5 is a view in rear elevation showing the frame applied to a long rectangular mirror.

Fig. 6 is a view in rear elevation showing the frame as applied to an oval mirror.

Fig. 7 is a view in section and elevation showing another form of the joint.

Fig. 8 is a view in section and elevation illustrating a modification of the joint structure.

Referring more particularly to the drawings, 10 indicates an automobile having a rigid supporting structure thereon, as for example, the wind shield frame 11. In the present application of this invention, it is desired to mount a rear sight mirror 12 upon the automobile in a position to permit the driver to observe the roadway in the rear of the vehicle and through the rear curtain window 13. This can be conveniently done by securing the mirror 12 upon the wind shield frame 11. It is to be understood, however, that the present invention is not entirely concerned with the mounting of a mirror but that the device might be easily used in connection with a spot light or other adjustable member. The preferred form of the invention is shown in Fig. 1 where it will be seen that a U-shaped spring clip 14 is provided to embrace the frame of a wind shield. This clip is fitted with a lining member 15 which will prevent scratching or other damage to the metal of the frame. Secured to the clip 14 is a socket member 16. This member is formed in its outer face with a hemispherical recess 17 into which a correspondingly shaped ball member 18 is adapted to project. The ball portion of the joint is formed at the center of a spider frame 19. This frame is here shown with four radially extending arms, three of which have overhanging end lugs as shown in Fig. 1. The other arm is equipped with an adjustable lug 21 which may be secured in position by a screw 22. The lug 21 has a straight shank adapted to extend between guide ribs 23 and 24 formed upon the back of the radially extending arm. By this means it is possible to securely hold a mirror 25 in fixed relation to the spider. It will also be evident that mirrors of various shapes might be used, as, for example, the circular mirror shown in Fig. 2, the rectangular mirror shown in Fig. 5, and the oval mirror shown in Fig. 6. In each instance the construction will be the same with the exception that the gripping faces of the lugs 20 must necessarily be designed to conform to the marginal edge of the mirror.

The ball portion of the spider 19 is indirectly held in its seated position within the socket 17 by a center bolt 26. This bolt extends through a protecting washer 27, one leg of the clip 14, the socket member 16, a hemispherical washer 28 and the ball member 18. As clearly shown in Fig. 1 the washer 28 seats within the cavity of the ball member 18 and is frictionally held against the surface thereof by an expansion spring 29. This spring rests with one end against the washer and the other end against a nut 30. An enlarged opening 31 is formed through the ball member 18 to permit a considerable range of movement without limitation from the bolt. In this form of the invention it will be evident that the spring will cause the inner and outer faces of the ball member to be frictionally engaged on one side by the face of the socket 17 and on the other side by the face of the washer 28. With sufficient tension upon the spring it will be possible to manually adjust the mirror in any desired position, after which it will be thus retained and will not be moved by vibration or road shock imparted to the vehicle.

In the form of the device shown in Fig. 7 a cast clip 32 is provided. This clip is secured to the wind shield frame by a set screw 33. A circular bore 34 is formed in the back of the clip and receives a socket member 35. This member is cylindrical and is adapted to slide longitudinally within the bore. An expansion spring 36 normally tends to force the socket outwardly and against the rear face of the ball member 18. In the present instance it will be noted that the hemispherical cavity within the ball member is formed with a series of circumferentially extending corrugations 37. These corrugations are adapted to be engaged by similar corrugations upon a hemispherical washer 38 which is held in position by a nut 39 of a bolt 40. This bolt is formed with lengths of two diameters, the smaller diameter extending through an opening of corresponding size in the washer 38 and the larger diameter extending through the socket member 35 and the clip 32. This large diameter makes a shoulder against which the washer 38 may be clamped by the nut 39. The head of the bolt rests within a resilient washer 41 which is seated within a counter bore on the clip 32 and normally bears against the glass of the wind shield.

In the form of the invention shown in Fig. 8 the spider is eliminated and a mirror back 42 is provided. This back is of pressed metal and has a circumferential flange 43 carrying a bezel ring 44, by which the glass will be secured in position. The mirror back in this instance is formed with a protruding ball member 45 extending into a socket frame 46. This frame is secured to a rigid supporting rod 47. The ball and socket are held together by a screw 48 passing through a nut 49. The nut is formed with a spherical recess receiving a friction washer 50 and adapted to conform to the back of the socket 46, thus insuring that the mirror back will be adjustably and frictionally held at any desired angle.

In operation, the clip 14 may be sprung over the frame portion of an automobile wind shield or other support, after which the mirror may be disposed in any angular position relative thereto by reason of the ball and socket joint. As the mirror swings, the movement will be accommodated by the opening 31 through the ball joint and it will be understood that by shaping this opening for a predetermined purpose the path of travel of the mirror in making various predetermined adjustments will be positively limited and defined. In the event that the ball and socket do not have sufficient engagement to frictionally hold the mirror in a predetermined adjusted position the mirror may be slightly rotated and this will act to rotate the nut 30 on the bolt 26, thereby tightening the spring 29. It will also be noted that the end of the bolt is upset to prevent the nut from working its way off from the bolt. By this means any desired tension may be exerted upon the spring and a suitable frictional engagement established between the surfaces of the ball and socket. The application and operation of the other forms of the joint are identical with that previously described.

It will thus be seen that a universal joint as here disclosed may be readily used to support a mirror or other desired article from a fixed support and in a manner to permit instant adjustment of the article and at the same time to permit the article to be automatically locked in its adjusted position while being manipulated by one hand of the operator.

While I have shown the preferred form of my invention as now known to me it will be understood that various changes in the construction, combination and arrangement of parts may be made by those skilled in the art without departing from the spirit of the invention as claimed.

Having thus described my invention, what I claim and desire to secure by Letters Patent, is:

1. A device of the character described comprising a yieldable clip, a socket member carried thereby, a ball member seated within said socket and being formed with a cavity in the back thereof, the walls of which are concentric with the outer walls of the ball, a hemispherical washer seated within the cavity and conforming to the contour thereof, a bolt passing through the ball and socket members and the washer, a helical spring mounted on the bolt and resting against the washer and an adjusting nut carried by the bolt, and adapted to bear against the washer to produce a desired frictional engagement between the joint members, and a plurality of arms emanating from the ball member to afford a mounting for an article to be supported.

2. A device of the character described comprising a clip, a socket member carried thereby, a ball member seated within said socket and being formed with a cavity in the back thereof, the walls of which are concentric with the outer walls of the ball, a hemispherical washer seated within the cavity and conforming to the contour thereof, a bolt passing through the ball and socket members and the washer, a helical spring mounted on the bolt and resting against the washer and an adjusting nut carried by the bolt and adapted to bear against the washer to produce a desired frictional engagement between the joint members, and a plurality of arms emanating from the ball member to afford a mounting for an arm to be supported, one of said arms being longitudinally extensible.

3. An automobile mirror including a clip formed to engage over an edge of the windshield frame and having a part arranged to have one face spaced from one of the side faces of the windshield glass, a washer engaged with said face of said part and formed to abut the said side face of the windshield glass, a rigid bolt passed through the washer and said part, the opposite face of said part being formed with a socket, a mirror frame having a hollow ball member engaged in the socket, a washer in the interior of the ball member, the bolt passing through the socket and through an enlarged opening provided therefor in the ball member and having a nut thereon disposed in the interior of the ball member, a spring acting against the ball member to tension same and a mirror borne by the frame and closing the inner end of the ball member.

4. An automobile mirror including a clip formed to engage over an edge of the windshield frame and to have one face spaced therefrom, said clip being formed with a socket, a mirror frame having a hollow ball member, engaged in the socket, a washer in the interior of the ball member, a bolt passing through the socket and through an enlarged opening provided therefor in the ball member and having a nut thereon disposed in the interior of the ball member, resilient means acting against the ball member to tension same and a mirror borne by the frame and closing the inner end of the ball member.

5. In an automobile mirror, a clip formed to engage a support, a frame having a hollow ball member with an open inner end, a socket member borne by the clip and formed on one side to receive the ball member cushioning means on the opposite side of the socket member, a bolt passed through the socket and ball members, and having one end arranged interiorly of the ball member, a spring to tension the ball member, and a mirror borne by the frame and closing the said inner end of the ball member.

6. In an automobile mirror, a socket member, means to secure same to a support, a bolt rigidly borne by the socket member, a frame having a series of radial arms, one of which is extensible and having a hollow ball member open at its inner end and received in the socket member and having an enlarged opening to receive the bolt, a spring to tension the ball member, and a mirror borne by the frame arms and extending over the inner end of the ball member.

7. A rear sight mirror for automobiles comprising a mirror, a frame therefor, a clamping device for attachment to the windshield of an automobile, and a ball and socket joint between said mirror frame and said clamping device, and including a single cupped member stationarily held on said frame, and a pair of cupped members stationarily held on said clamping member and engaging opposite sides of said other cup member, said clamping device having a stud projecting through said cupped members, and a spring on the inside of the innermost member for holding all of said members in frictional contact.

In testimony whereof I have hereunto set my hand.

RUEL I. SHORT.